United States Patent [19]

Perry

[11] 4,426,177
[45] Jan. 17, 1984

[54] AUTOMATIC FAULT DETECTION SYSTEM FOR A MACHINE TOOL

[75] Inventor: Louis J. Perry, Oak Park, Mich.
[73] Assignee: Invo Spline, Inc., Warren, Mich.
[21] Appl. No.: 297,797
[22] Filed: Aug. 31, 1981
[51] Int. Cl.³ .................. B23B 47/24; B23G 1/00; G01L 19/06
[52] U.S. Cl. .................. 408/8; 116/70; 83/62.1
[58] Field of Search .......... 408/8, 7, 6; 409/134; 116/70; 83/62.1, 67

[56] References Cited

U.S. PATENT DOCUMENTS

| | | | |
|---|---|---|---|
| 2,640,515 | 6/1953 | Johnson | 408/8 |
| 3,302,492 | 2/1967 | Weidig | 408/8 |
| 3,647,998 | 3/1972 | Rohraff | 408/6 |
| 3,682,129 | 8/1972 | Philbrick | 116/70 |
| 4,056,329 | 11/1977 | Perry | 408/7 |
| 4,180,356 | 12/1979 | Hoch | 408/7 |
| 4,310,269 | 1/1982 | Neu et al. | 408/8 |

Primary Examiner—James M. Meister
Assistant Examiner—Paul M. Heyrana
Attorney, Agent, or Firm—Cullen, Sloman, Cantor, Grauer, Scott & Rutherford

[57] ABSTRACT

An automatic fault detection system for use with machine tools to detect the breakage or absence of the tool, the presence and/or absence of a portion of the workpiece, and to prevent the normal cycle of operation of the machine when such condition exists, includes a sensor having a rod, a power port and a pair of pressure sensing ports. First and second pressure sensing switches are connected to the sensing ports wherein the failure of the sensor rod to fully retract or to advance before or beyond good check stroke position respectively exhausts the pressure sensing switches preventing operation of the machine cycle.

8 Claims, 6 Drawing Figures

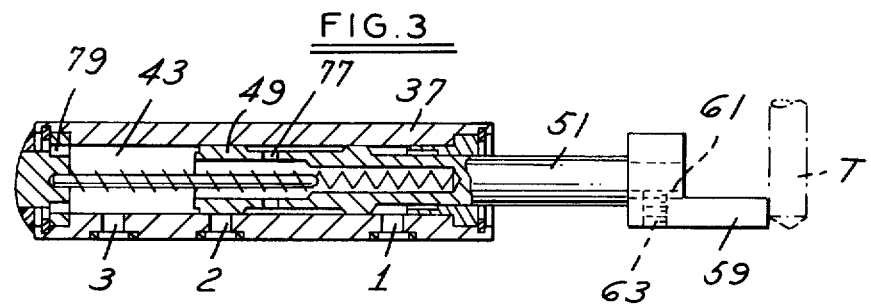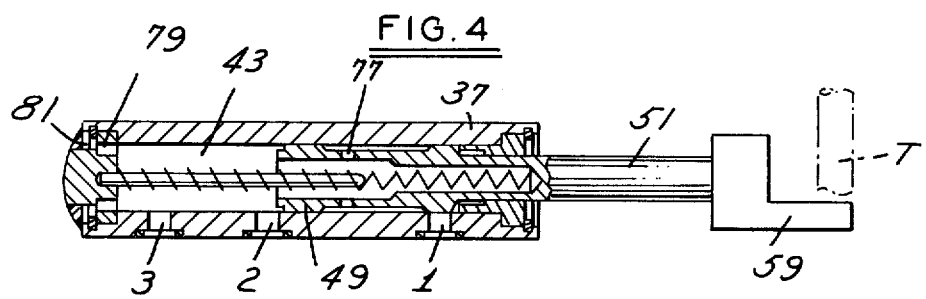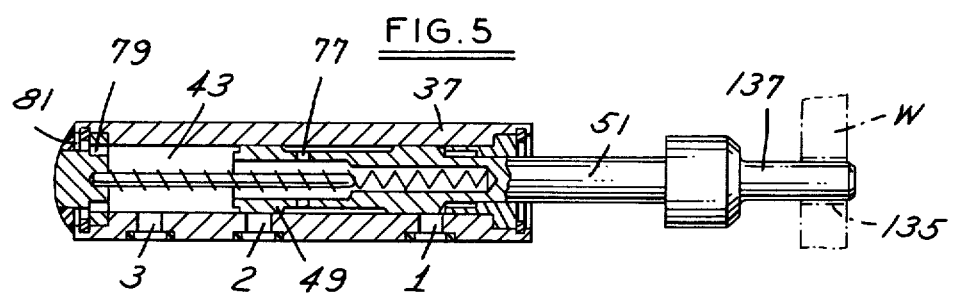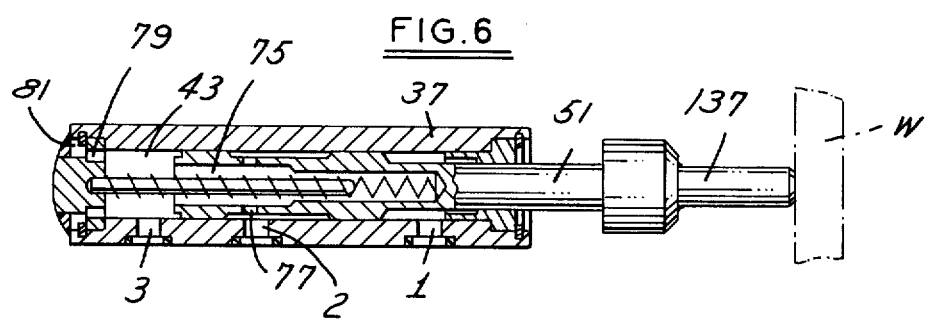

AUTOMATIC FAULT DETECTION SYSTEM FOR A MACHINE TOOL

BACKGROUND OF THE INVENTION

1. Field of the Invention

Sensors with related hardware, pneumatic and electric control circuits are used with machine tools in order to detect the breakage or absence of a tool, the presence and/or absence of a portion of a workpiece and/or other improper conditions which might result in the production of imperfect work, have been employed to prevent the normal operation of the machine whenever such conditions exist.

2. Description of the Prior Art

Illustrative of the prior art is my U.S. Pat. No. 4,056,329 dated Nov. 1, 1977 and entitled "Detection System for Machine Tools" and U.S. Pat. No. 3,647,998 dated Mar. 7, 1972 and entitled "Broken Tool Detector."

SUMMARY OF THE INVENTION

An important feature of the present invention is to provide in an automatic fault detection system a sensor having a movable detecting member in the form of a rod located within a cylinder. The cylinder is provided with a power port and first and second spaced apart pressure sensing ports. The fault detection system will indicate, depending upon whether a first pressure sensing switch means connected to the first pressure sensing port is pressurized, when the rod is or is not fully retracted and will also indicate, depending upon whether a second pressure sensing switch means connected to the second pressure sensing port is pressurized, when the rod has engaged the target to a good check stroke position or has moved before or beyond the target to indicate a fault condition.

A further feature of the present invention is to provide in the automatic fault detection system a pneumatic control circuit by which pressurized air is directed to the power port to effect a retraction of the rod of the sensor and pressurized air is directed to a pressure sensing port to verify that the rod has in fact retracted fully. Also on command from the machine pressurized air is removed from the power port and the first pressure sensing port and applied to the second pressure sensing port, wherein the rod is spring biased toward a test position, and wherein the rod fails to move or moves past an intended target shows an incorrect check stroke position, a broken or missing tool or a fault in the workpiece such as the absence of a predrilled hole, the second pressure sensing port will be exhausted to atmosphere, the fault detection system will indicate a fault condition and result in a deactivation of the machine.

These and other features will be seen from the following specification and claims in conjunction with the appended drawings.

BRIEF DESCRIPTION OF THE DRAWINGS

FIG. 3 is a similar view on a reduced scale illustrating the sensor rod advanced to a good check stroke position.

FIG. 4 is a view similar to FIG. 3, showing the sensor rod advanced to a fault position.

FIG. 5 is a view similar to FIG. 3, showing a probe type sensor rod advanced to a good check stroke position.

FIG. 6 is a view similar to FIG. 5 wherein the rod has been advanced to a fault position.

It will be understood that the above drawings illustrate merely a preferred embodiment of the invention, and that other embodiments are contemplated within the scope of the claims hereafter set forth.

DETAILED DESCRIPTION OF AN EMBODIMENT OF THE INVENTION

Figure 1:
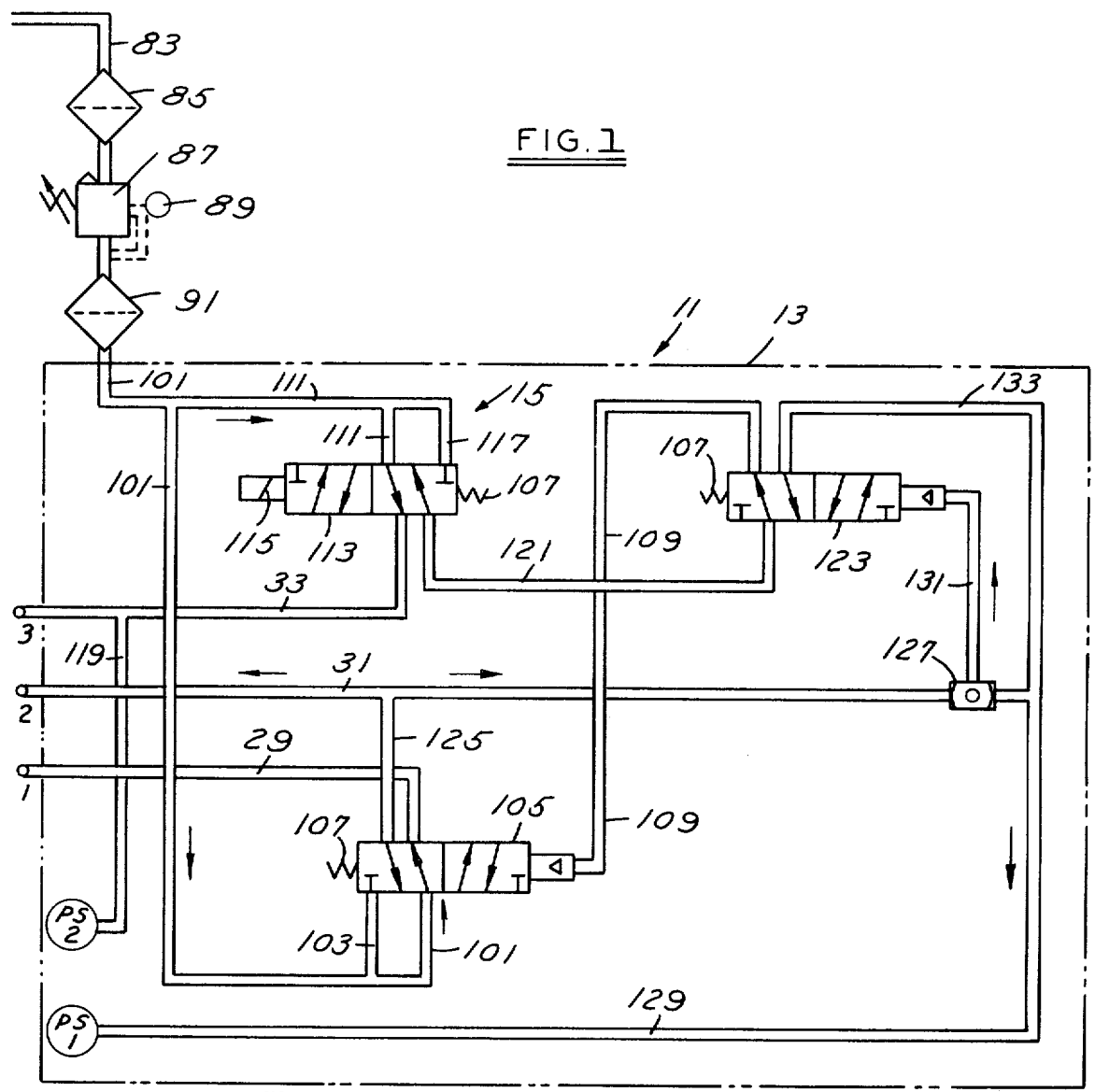
FIG. 1 is a schematic diagram of the pneumatic control circuit for the present fault detection system.
Figure 2:
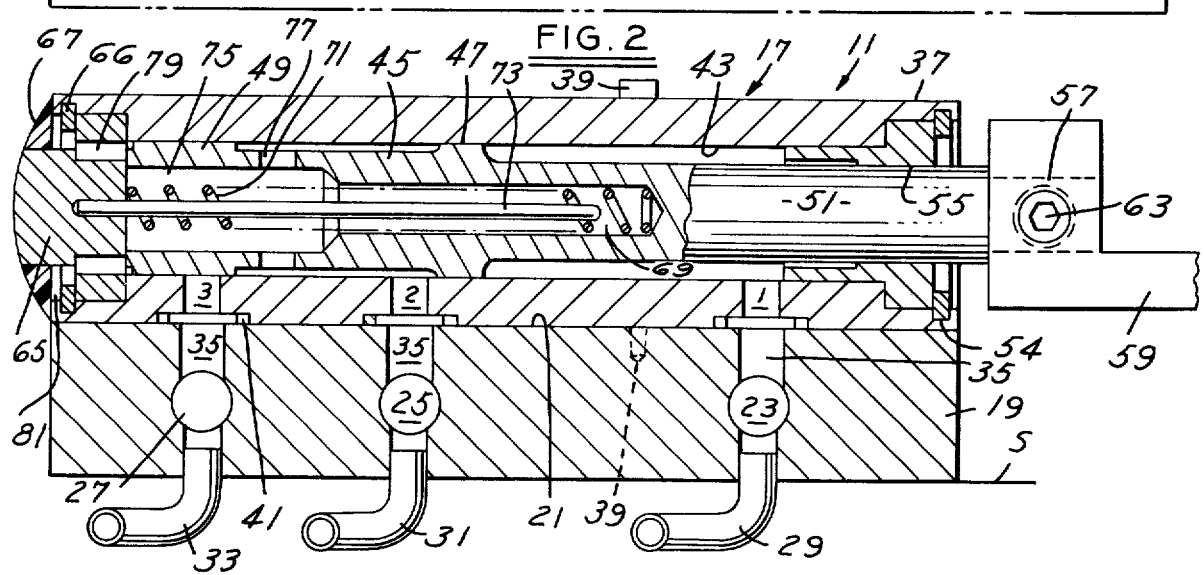
FIG. 2 is a longitudinal sectional view of a novel combination mechanical/pneumatic limit valve referred to as a sensor for the fault detection system and shown in a fully retracted position.

An automatic fault detection system for machines or machine tools is generally indicated at 11, FIGS. 1 and 2 and includes the control unit 13 having a pneumatic control circuit 15 within an enclosure. The fault detection system 11 includes a mechanical-pneumatic cylinder and limit valve combination which is referred to herein as sensor 17, FIG. 2.

The present sensor 17 is mounted upon an elongated rectangular sub-base or manifold 19 located upon a suitable support S. The sub-base 19 has a flat top or surface 21 and upon one side thereof ports 23, 25 and 27. These ports are respectively connected by the lines 29, 31 and 33 into the pneumatic control circuit 15 of control unit 13.

The respective ports 23, 25 and 27 terminate in the upwardly opening passages 35 at the top surface 21 of sub-base 19 and are adapted for respective cooperative sealing registry with power port 1 and the first and second pressure sensing ports 3 and 2 respectively as shown in FIG. 2.

Ports 1, 2 and 3 are formed within elongated rectangular body 37 which snugly overlies sub-base 19 in sealing relation with respect to the passages 35 uncluding the O-ring seals 41, and is secured thereto by a plurality of mounting screws 39 which extend through the body 37 and into the sub-base 19.

The body 37 has a cylindrical bore 43 adapted to receive the rod 51. Rod 51 includes the spool portion 45 movably nested with the bore 43 including spaced first and second cylindrical lands 47 and 49, sometimes referred to as front and rear lands respectively. Rod 51 loosely and guidably extends through a partly oversized bore 55 within the front bushing 53, suitably secured within the body 37 as by a retaining ring 54 and a press fit. Rod 51 projects from body 37 and includes a stud 57 of reduced diameter over which is mounted the L-shaped end tip 59 secured thereto by the set screw 63 which extends through the end tip 59 into a whistle shaped notch 61 formed in stud 57, FIG. 3.

The cylinder defined by the body 37 and bore 43 further includes an end cap 65 which is projected into the opposite end portion of body 37 over which is positioned the end cap cover 67 made from a plastic or flexible material. The face 68 of the cover 67 is provided with small ridges and grooves or passages, not shown, to permit air to vent to atmosphere. A snap ring 66 anchors cap 65 within the body 37.

Rod 51 has an axial bore 69 adapted to receive one end of the compression spring 71 which loosely extends around the axially disposed guide rod 73 secured to end cap 65. The opposite end of the spring 71 is in engagement with the end cap 65 and is adapted to normally bias the rod 51 from the retracted position shown in FIG. 2 to the advanced positions shown in FIGS. 3, 4, 5 and 6.

Included within the spool portion 45 outwardly of the bore 69 is an axial passage 75, sometimes referred to as a vent passage, receiving the spring 71, which in any of the positions of the rod 51 shown in FIGS. 3 through 6 communicates with axial apertures 79 within the end cap 65 and through passages 81 for communication to atmosphere through the grooves or passages in the end cap cover 67.

Referring to the control unit 13 which includes the pneumatic control circuit 15, FIG. 1, air line 83 connected to a source of air under pressure delivers pressurized air through filter 85, through the pressure regulator 87, preset at 50 to 60 pounds per square inch and including the visual gauge 89 and through the final filter 91 which is in communication with pressure line 101.

Line 101 includes a parallel branch line 103 with both lines 101 and 103 connected to the air controlled valve 105 including spring 107 for normally maintaining the valve element in the position schematically shown in FIG. 1. Line 101 to air valve 105 pressurizes line 29 to power port 1, FIG. 2.

The air valve 105 has connected to one end thereof, the control line 109 which when it receives pressurized air, will move the air valve 105 to a secondary position against the action of spring 107. The pneumatic control circuit 15 includes pressure line 111 connected to line 101 for delivering pressurized air to the solenoid controlled air valve 113. The valve 113 is under the control of the normally de-energized solenoid 115 and includes coil spring 107 for maintaining the valve 113 in the schematic position shown in FIG. 1, for the passage of pressurized air as permitted by the location of the respective arrows in its movable valve element.

Pressure line 111 has a branch line 117 further connected to the solenoid controlled air valve 113. In the de-energized condition of the valve 113, FIG. 1, pressurized air from line 111 passes through the valve 113 through line 33, also shown in FIG. 2, pressurizing the first pressure sensing port 3.

Line 119 interconnects line 33 to first pressure sensing switch PS2, which upon a build up of pressure at the pressure sensing port 3 is actuated, indicating that the sensor rod 51 is fully retracted.

When solenoid 115 is energized, valve 113 shifts to its secondary position, pressurized air through branch line 117 passes through line 121 through the air valve 123 delivering pressurized air through the control line 109 to the air valve 105. Upon a build up of pressure within the control line 109, valve 105 will shift to its secondary position. In such position, pressure line 101 is blocked from line 29 to power port 1 of the sensor 17, FIG. 2. At the same time, pressurized air from the branch 103 passes through the shifted air valve 105 and through line 125 for communication with line 31 directed to the second pressure sensing port 2 within the sensor 17 as shown in FIGS. 1 and 2.

Since power port 1 and pressure sensing port 3 have been exhausted, the rod 51 forming a part of the sensor 17, is biased by spring 71 to one of the positions shown in FIGS. 3 through 6, as for example the position shown in FIG. 3. This is a good check stroke position. An extension of the line 31 connects the shuttle valve 127, FIG. 1 and through the line 129 is connected to the second pressure sensing switch PS1, FIG. 1. Accordingly, if the rod 51 of the sensor 17 is advanced such as to the position shown in FIG. 3 or to the position shown in FIG. 5 for a good check stroke position, the rear land 49 prevents the venting of pressurized air from the pressure sensing port 2. This results in a build up of pressure in the line 129 to actuate the second pressure sensing switch PS1, FIG. 1.

Under those conditions, a build up of pressure occurs in the branch line 131 from the shuttle valve 127 to the pilot port of the air valve 123 reversing the condition thereof against the action of the spring 107. Accordingly, assuming the solenoid 115 has been energized, pressurized air through the line 121 to control line 109 is blocked. Pressurized air from line 121 passes through the line 133 and communicates with line 129 to the pressure sensing switch PS1. This maintains the second pressure sensing switch PS1 actuated.

With pressure cut-off from line 109, the spring 107 of the air valve 105 returns the valve to the position shown in FIG. 1 re-establishing pressurized air through line 101 and line 29 to power port 1. This pressurization of port 1, FIG. 2 causes a retraction of the rod 51 against the action of spring 71, towards the position shown in FIG. 2.

Where the target of the rod 51 FIGS. 5 and 6 is in the nature of a workpiece W within which there has been a pre-drilled bore 135, the rod, instead of employing end tip 59, FIGS. 2, 3 and 4 has secured over the end thereof probe end tip 137. Its diameter is sufficiently less than the bore 135 so that when the spring biased rod 51 is advanced to the position shown in FIG. 5, the probe end tip 137 will cooperately project through the pre-existing workpiece bore 135 to a "good check stroke position," such that the rear land 49 upon the spool portion 45 is in a blocking position with respect to the second pressure sensing port 2.

In the event that the intended aperture 135 has not been formed within the workpiece W indicating a defect in the workpiece, the probe end tip 137 will be limited in its forward travel as shown in FIG. 6 in operative engagement with the workpiece W. This is a fault position, since the rod 51 is only extended partly rather than the full distance (good check stroke position) that it would normally move as in FIG. 5, were the pre-drilled aperture 135 or other keyway or slot in the workpiece present. Accordingly, the fault condition is demonstrated in FIG. 6 is due to the absence of the required aperture or slot or keyway 135. This limits the spring biased outward movement of the spool portion 45, and the second pressure sensing port 2 is not blocked by the land 49. Pressurized air at pressure sensing port 2 passes through radial opening 77 and into the axial passage 75 extending to and vents through the passages 79 and 81, FIG. 2.

With the failure of a pressure build up at the pressure sensing port, there will be no pressure build up in the line 129 with the result that the second pressure sensing switch PS1 will remain unactuated. Further cycling of the machine is prevented. At the same time, there will be insufficient pressure build up in the line 131 from the shuttle valve 127 so that the air valve 123 would be in the schematic position shown in FIG. 1. This would result in the pressure line 121 delivering pressure through the air valve 123 through the control line 109 to the air valve 105 which would then remain actuated. The sensor rod 51 will then remain extended until the solenoid 115 is de-energized. At that time the air valve 113 will return to the normal position and the sensor rod 51 will retract.

OPERATION

FULLY RETRACTED POSITION END TIP 59, PROBE TIP 137

This represents the full retraction of the detecting member or rod 51 to the position shown in FIG. 2. Air pressure power at port 1 overcomes the spring force 71 and rod 51 retracts so that its rear land 49 blocks pressure sensing port 3, FIG. 2. A build up of air pressure at the pressure sensing port 3 is transmitted through the line 119 to the first pressure sensing switch PS2 indicating that the rod 51 is fully retracted.

Should any factor prevent a full retraction such as a build up of chips in connection with the end tip, any other mechanical device blocking such retraction movement, as for example an interfering part, pipe, or broken air line then the spool portion 45 will not return to the fully retracted position shown in FIG. 2. In this case, the first pressure sensing port 3 is not blocked by land 49 so that the pressurized air at pressure sensing port 3 is vented into passage 75 and passages 79 and 81 to atmosphere. With no build up in pressure at pressure sensing port 3 the line 119 will not transmit sufficient pressure to actuate the first pressure sensing switch PS2.

GOOD CHECK STROKE POSITION, FIG. 3

When the sensing member or rod 51 previously returned to a fully retracted position as shown in FIG. 2 actuates pressure sensing switch PS2, and a "start check signal" energizes the solenoid 115, FIG. 1, air valve 113 will shift with the result that air pressure from power port 1 and pressure sensing port 3 is removed and the rod 51 extends under spring force 71 until it contacts the tool T shown in FIG. 3. In such position, the rear land 49 is blocking the pressure sensing second port 2. This indicates a good check stroke position. The build up of pressure at pressure sensing port 2 is transmitted as shown in FIG. 1 from passage 31 to the right side of FIG. 1 through the shuttle valve 127 pressurizing line 131 and shifting air valve 123. This allows air pressure to reach lines 133 and 129 actuating the second pressure sensing switch PS1. This would normally initiate the cycle of operation of the machine tool under the control of PS1.

With the energization of the solenoid 115 and the shifting of the valve 113, port 3 namely, the first pressure sensing port is exhausted. Line 121 feeds pressure air through the valve 123 and through line 109 to the pilot port of the air pressure valve 105 shifting the valve. It was this previous action which cut off pressurized air from power port 1 and pressure sensing port 2 while pressurizing second pressure sensing port 2.

As above described with the pressure build up at pressure sensing port 2, due to the good check stroke position shown in FIG. 3, pressure sensing switch PS1 is actuated to permit a new cycle of operation of the machine tool. By de-energizing the solenoid 115, the valve 113 returns to the normal position as shown in FIG. 1. First pressure sensing port 3 is pressurized. Also air in line 109 has been exhausted. Valve 105 returns to the normal position under action of spring 107 and power port 1 is pressurized causing the rod 51 to retract to the position shown in FIG. 2. The fault detection system is now in the normal start position.

FAULT CONDITION, FIG. 4

After receiving the start check signal, the control circuit 15 removes air pressure from power port 1 and pressure sensing port 3 and rod 51 extends under spring force 71 past the broken tool T shown in FIG. 4 and the rear land 49 does not block pressure sensing port 2. On the other hand, the pressurized air at pressure sensing port 2 exhausts through the sensor 17 to atmosphere passing into bore 43 and through passages 79 and 81. Since there is no pressure build up at pressure sensing port 2, the second pressure sensing switch PS1 remains unactuated and the control to the machine tool remains deactivated.

The fault condition of the rod 51 occurs in FIG. 4 when there is a broken tool T or the absence of any tool so that the rod 51 extends to a full stroke or fault position. When the start check signal is removed from the control unit 13, power port 1 and pressure sensing port 3 are again pressurized and the rod returns to the fully retracted position shown in FIG. 2.

GOOD CHECK STROKE POSITION, PROBE END TIP 137, FIG. 5

When the detecting member or rod 51 is fully extended, the probe tip 137 has passed through the pre-existing and required aperture 135, or slot or keyway to a full stroke position or check stroke which is a "good check stroke" as shown in FIG. 5. In this position of the rod 51, the rear land 49 is blocking the pressure sensing port 2 with the result of a pressure build up through line 31 and line 129 actuates the second pressure sensing switch PS1 and this indicates a good check stroke position.

FAULT POSITION, PROBE END TIP 137, FIG. 6

The partial extension of the rod 51 due to the absence of the bore or passage or slot 135, produces the same condition as has been previously described with respect to FIG. 4. In this case, the pressure sensing port 2 communicates with opening 77, passage 75, bore 43 and the passages 79 and 81 venting to atmosphere. With failure of pressure build up within the line 129 the second pressure sensing switch PS1 remains unactuated and the machine tool cycle is not reactivated.

The present fault detection system eliminates a costly undetected broken tool or tool absence which could result in damage to parts or to other tooling and to lengthen machine down time.

The present mechanical sensor and the related end tips 59 and 137 are designed for application to automated rotary index and in-line transfer, screw, progressive stamping and assembly machines.

The fault detection system detects the presence and/or absence of rotating or non-rotating machine tools like drills, taps and reamers and will shut down the machine tool when a broken tool or the absence of a tool is detected. The present sensor 17 such as shown in FIGS. 5 and 6 employs a probe end tip 137 adapted to detect part features in a workpiece such as holes, slots or keyways, such as hole 135 in the workpiece, FIG. 5 or its absence from the workpiece in FIG. 6.

One further advantage in the function and operation of the present sensor 17 is that it is air purged since a pressure build up within the bore 43 from power port 1 permits some air to pass along the rod 51 with respect to the slightly oversized bore 55 of the front bushing 53. The flow of such limited amounts of air is adapted for the removal of fluids, chips or dirt from the detecting end of rod 51 and the end tip 59 or 137 connected thereto. The end cap 65 and end cap cover 67 totally encloses and protects the sensor 17 from outside contaminants while still allowing the sensor 17 to vent to atmosphere in the event of a fault condition.

The present automatic fault detection system starts with a positive mechanical movement of the sensor rod 51 under the action of the spring 71. The rod 51 extends under spring force to the specific "check stroke position" such as in FIGS. 3 or 5, then retracts by air pressure acting through power port 1, upon spool portion 45. The sensor assembly 17 shown in FIGS. 2, 3 and 4 is adapted to detect for presence by contact in the object T. The presence of the object, FIG. 3 is a good check condition. The present fault detection system reverses traditional methods of detection by starting each "check cycle" in a fault mode. Before the machine can receive an "OK to run" signal both the fault detection system controls and the target being detected must be proven correct by the proper mechanical movement of the sensor rod. Therefore, the fault detection system verifies all system components for correct operation in addition to the target each "check cycle."

The other type of sensor referred to as a probe end tip 137, FIGS. 5 and 6 is checking for absence by not contacting the object or workpiece W. The absence of the object namely, an aperture, a slot or a groove, results in a "good check stroke condition," FIG. 5. A fault check with the aperture 135 or groove missing is shown in FIG. 6.

Having described my invention, reference should now be had to the following claims.

I claim:

1. A fault detection system for use with a machine and operable through a cycle of operation upon receipt of a start check signal from the machine;
   comprising a combination pneumatic-mechanical cylinder limit valve forming a sensor which includes a movable rod provided with a spool portion;
   said sensor further including a power port and first and second pressure sensing ports;
   means biasing said rod to an extended position into engagement with a target such as a tool or a workpiece, the presence of which is necessary for proper operation of the machine;
   a control unit including a source of air under pressure;
   first means operable upon supplying air under pressure to said control unit which then allows air to reach said first pressure sensing port and said power port to move said rod towards a retracted position;
   said first pressure sensing port being normally vented to atmosphere but blocked by said spool portion and rod when said rod is fully retracted;
   a first pressure sensing switch responsive to and actuated by a pressure build up at said first pressure sensing port when said rod is fully retracted;
   second means connected to said first means and effective when energized by receipt of the start check signal after said first pressure sensing switch is actuated to shift said first means to thereby block the flow of air to said power port and to said first pressure sensing port, and successively supply air under pressure to said second pressure sensing port;
   means venting said second pressure sensing port to atmosphere except when said rod is extended by its biasing means and thereby moved to a good check stroke position engaging the target and blocking said second pressure sensing port;
   and a second pressure sensing switch responsive to and actuated by a build up of pressure at said second pressure sensing port due to said blockage to activate the machine for a cycle of operation.

2. The fault detection system of claim 1, said sensor including a sub-base mountable upon a support having a power port and a pair of pressure sensing ports respectively connected to said control unit, and corresponding outlets in the top of said sub-base;
   an elongated rectangular body having a cylindrical bore receiving said rod overlying and secured to said sub-base, said body having a power port and a pair of pressure sensing ports communicating with said bore and with the power and pressure sensing ports of said sub-base respectively.

3. The fault detection system of claim 1, said sensor including a cylinder having a bore;
   said rod being nested within said cylinder bore and having an axial bore at one end and upon its exterior a pair of spaced cylindrical lands defining said spool portion;
   said biasing means including a coil spring nested in compression within said sensor bore and engaging a portion of said cylinder;
   normally urging said rod outwardly of said cylinder for engagement with said target;
   application of pressurized air to said power port applied to said rod, adapted to retract said rod towards a fully retracted position;
   one of said lands when said spool portion is fully retracted blocking said first pressure sensing port and actuating said first pressure sensing switch.

4. The fault detection system of claim 3, another of said lands blocking said second pressure sensing port when said rod is fully extended into engagement with said target, actuating said second pressure sensing switch.

5. The fault detection system of claim 1, said first means including a normally de-energized solenoid control valve for directing pressurized air to said first pressure sensing port, and to an air operated valve for directing pressurized air to said power port.

6. The fault detection system of claim 5, said second means including the solenoid of said solenoid control valve;
   and a second air valve connecting said solenoid control valve to said second pressure sensing port, said rod when extended to a good check position, blocking said second pressure sensing port resulting in a build up of air pressure effective to actuate said second pressure sensing switch and thereby activate the machine for a repeat cycle of operation.

7. The fault detection system of claim 1, failure of said rod to move to a fully retracted position, said first pressure sensing port being vented to atmosphere, said first pressure sensing switch remaining in the normal state, the machine cycle remaining deactivated to signal correctable interference with retracting movements of said rod.

8. The fault detection system of claim 1, said rod upon exhausting said power port, being biased toward the target, a broken tool, a missing tool, and absence of a bore in a workpiece, permitting said rod to advance to a full stroke fault position;
   said positioning of said rod venting said second pressure sensing port to atmosphere, said second pressure sensing switch and said machine cycle remaining deactivated.

* * * * *